United States Patent
Dreier et al.

(10) Patent No.: US 8,055,418 B2
(45) Date of Patent: Nov. 8, 2011

(54) AUTOMATED MANUAL TRANSMISSION SHIFT METHODOLOGY FOR TANKER TRUCKS

(75) Inventors: Loren Christopher Dreier, Southern Pines, NC (US); Ingo-Gerd Sauter, Meckenbeuren (DE)

(73) Assignee: ZF Friedrichshafen, Friedrichshafen (DE)

( * ) Notice: Subject to any disclaimer, the term of this patent is extended or adjusted under 35 U.S.C. 154(b) by 446 days.

(21) Appl. No.: 12/418,561

(22) Filed: Apr. 3, 2009

(65) Prior Publication Data

US 2010/0256882 A1    Oct. 7, 2010

(51) Int. Cl.
G06F 7/00 (2006.01)
G06F 17/00 (2006.01)
(52) U.S. Cl. .......................... 701/62; 701/61
(58) Field of Classification Search .............. 701/55, 701/61, 62, 104; 280/6.151, 766.1
See application file for complete search history.

(56) References Cited

U.S. PATENT DOCUMENTS

| | | | |
|---|---|---|---|
| 5,765,121 A | 6/1998 | Schwager et al. | |
| 5,878,365 A | 3/1999 | Onogi et al. | |
| 6,324,447 B1 | 11/2001 | Schramm et al. | |
| 6,452,487 B1 | 9/2002 | Krupinski | |
| 7,028,795 B2 * | 4/2006 | Tabata | 180/65.21 |
| 2004/0070121 A1 * | 4/2004 | Ohnsmann | 266/166 |
| 2008/0217874 A1 * | 9/2008 | Miskin | 280/6.151 |

* cited by examiner

*Primary Examiner* — Gertrude Arthur Jeanglaude
(74) *Attorney, Agent, or Firm* — Brinks Hofer Gilson & Lione (57) ABSTRACT

A method and system for hybrid automated manual transmission and non-hybrid automated manual transmission shift methodologies for tanker trucks are disclosed. A request is received to change a transmission gear ratio of a vehicle transporting a liquid. The request is rejected if a condition indicative of liquid sloshing is detected, and the gear ratio is changed from a current gear ratio to a target gear ratio if the condition indicative of liquid sloshing is not detected. A trigger may enable the detection of liquid sloshing. A transmission controller selects a current gear ratio of the transmission, detects a condition indicative of sloshing of the liquid transported by the vehicle, disables a selection of a select a target gear ratio of the transmission if the condition indicative of liquid sloshing is detected, and selects a target gear ratio of the transmission if the condition indicative of liquid sloshing is not detected.

24 Claims, 5 Drawing Sheets

AUTOMATED MANUAL TRANSMISSION SHIFT METHODOLOGY FOR TANKER TRUCKS

TECHNICAL FIELD

This application relates generally to control methods for vehicle transmissions, and more specifically, to hybrid automated manual transmission and non-hybrid automated manual transmission shift methodologies for tanker trucks.

BACKGROUND

Trucks utilizing automated mechanical transmissions (also referred to as automated manual transmissions) depend on gear shifting logic or algorithms to determine the appropriate gear for a wide variety of conditions. Each shift decision may be based on a balance between fuel efficiency and performance to provide a desired driving experience. One of the significant parameters impacting this balance is the total mass or weight of the vehicle. For example, a truck carrying no payload may shift to a higher gear by skipping one or more gears to improve fuel efficiency and yet still maintain an adequate level of performance. However, a truck carrying a heavy payload may upshift through each gear and engage each gear for a longer period of time to improve performance by transmitting an increased amount of power from the engine.

Some systems rely on the equation for Newton's second law of motion, force=mass*acceleration, to calculate a vehicle's mass or weight for use in a shifting algorithm. For example, the engine torque is related to the force that propels the vehicle. When the engine torque is known, the vehicle mass may be derived through a calculation based on the vehicle's acceleration. A system may repeat the calculation several times to provide a more accurate mass or weight value.

The vehicle must be in motion for this mass determination method to work because it requires measurement of a useful acceleration value. Also, this method typically uses an average of several calculations, and a single inaccurate calculation may adversely impact the mass or weight value. Furthermore, collecting and averaging several calculations takes time during which shifting performance may be negatively affected.

Gear shifting logic or algorithms for automated mechanical transmissions used in tanker trucks that transport various liquids present additional challenges. For example, a tanker truck may refer to a truck with a tank affixed to the truck chassis, or a truck tractor pulling a trailer with a tank. Liquid in a tank responds to acceleration or deceleration by displacing, keeping its surface perpendicular to the combined gravity and acceleration or deceleration forces. The kinetic energy of the liquid in the tank is increased or decreased through its interaction with the tank surfaces. A tank that is filled to less than full capacity allows the liquid to move from front to back or back to front during acceleration or deceleration. This movement of liquid is referred to as sloshing. If the sloshing results in a significant and sudden transfer of kinetic energy to or from the liquid in the tank, the transfer effectively imparts a force against the front or back ends of the tank which may affect the vehicle acceleration or deceleration.

The force of the sloshing liquid imparted to the vehicle may result in inaccurate mass-estimations because the force may cause a sudden acceleration or deceleration of the vehicle. Further, if a sloshing force is imparted during a transmission gear shift, the intended gear ratio may not be engaged in a manner that ensures a comfortable, safe ride, or the intended gear may not be engageable at all, which may create an unstable and sometimes hazardous driving situation.

BRIEF SUMMARY

Therefore, it would be advantageous if the automated mechanical transmission system could incorporate one or more vehicle operating conditions indicative of liquid sloshing when the truck or tractor is transporting a liquid. Specifically, an automated mechanical transmission system control unit that incorporates one or more vehicle operating conditions indicative of liquid sloshing may improve the accuracy of vehicle mass estimations and may also reduce or avoid the problems associated with engaging a target gear ratio during sloshing conditions.

In one embodiment, there is a method of changing gear ratios of a transmission in a vehicle transporting a liquid. A request is received to change a gear ratio in a transmission of a vehicle transporting a liquid, wherein the change is from a current gear ratio to a target gear ratio. The request is rejected if a condition indicative of liquid sloshing is detected. The gear ratio in a transmission is changed from the current gear ratio to the target gear ratio if the condition indicative of liquid sloshing is not detected. In one implementation, in response to receiving a trigger, the detection of liquid sloshing is enabled, wherein the trigger is indicative of the occurrence of a triggering event.

In another embodiment, a method of changing gear ratios of a transmission in a vehicle transporting a liquid is disclosed. A condition is detected that is indicative of liquid sloshing in a vehicle transporting a liquid. An ability to change a gear ratio in a transmission of the vehicle from a current gear ratio to a target gear ratio is disabled. If an absence of the condition indicative of liquid sloshing is detected, the ability to change a gear ratio in a transmission of the vehicle from a current gear ratio to a target gear ratio is restored. In one implementation, in response to receiving a trigger, the detection of liquid sloshing is enabled, wherein the trigger is indicative of the occurrence of a triggering event.

According to one embodiment, a vehicle includes a prime mover, a transmission that couples prime mover power from a transmission input to a transmission output at a plurality of different gear ratios, a sensor that can receive a signal indicative of sloshing of a liquid transported by the vehicle, and a controller in communication with the sensor and the transmission. The transmission controller selects a current gear ratio of the transmission, detects a condition indicative of sloshing of the liquid transported by the vehicle, disables a selection of a target gear ratio of the transmission if the condition indicative of liquid sloshing is detected, and selects a target gear ratio of the transmission if the condition indicative of liquid sloshing is not detected.

Other embodiments, and features and advantages thereof are possible and will be, or will become, apparent to one with skill in the art upon examination of the following figures and detailed description. Hence, it is intended that the scope of the claimed invention as recited in the claims below will not be limited to the embodiments shown and described herein.

DETAILED DESCRIPTION OF THE DRAWINGS AND THE PRESENTLY PREFERRED EMBODIMENTS

Trucks with automated mechanical transmissions may be utilized to transport or tow a variety of payloads. A controller for an automated mechanical transmission may examine the current operating conditions and select an appropriate transmission gear ratio. The total mass or weight of the vehicle is an operational condition that influences the selection of the transmission gear ratio. A truck transporting a relatively small payload may shift to a higher gear by skipping one or more gears to improve fuel efficiency while maintaining an adequate level of performance. In contrast, a truck carrying a heavier payload may upshift through each gear and engage each gear for a longer period of time to improve performance by transmitting an increased amount of power from the prime mover. Under normal conditions, the mass of the vehicle may be estimated by dividing the net force accelerating the vehicle by the measured acceleration of the vehicle. The net force of acceleration acting on the vehicle is the traction force applied by the prime mover through the vehicle drive wheels, offset by the rolling resistance of the vehicle, the wind resistance acting against the vehicle, and if the vehicle is travelling on a road surface that is not level, the component of the gravitational force acting parallel to the road surface.

However, sloshing of a liquid in a tanker truck may introduce additional forces that accelerate or decelerate the tanker truck. Specifically, the inertia of the liquid imparts a force when the liquid collides with the front or rear of the liquid tank of the tanker truck. These forces may cause an inaccurate mass calculation. The inaccurate mass calculation may cause the transmission controller to select an incorrect gear shift. Further, a rapid acceleration or deceleration of tanker truck caused by liquid sloshing may cause a missed shift, an uncomfortable shift, and/or a vehicle-destabilizing shift, because the synchronization of the prime mover and transmission components required in a gear ratio change may be difficult to achieve when sloshing occurs.

In one embodiment, a transmission controller system may avoid inaccurate mass estimates, selection of incorrect shifting algorithms, and missed shifts by inhibiting mass calculations or gear ratio changes when the system detects sloshing conditions. The detection of sloshing conditions may be enabled by an event trigger, such as when a tanker trailer is connected to a tractor. Such a transmission controller system and method are explained in further detail below through the figures and accompanying text.

Figure 1:
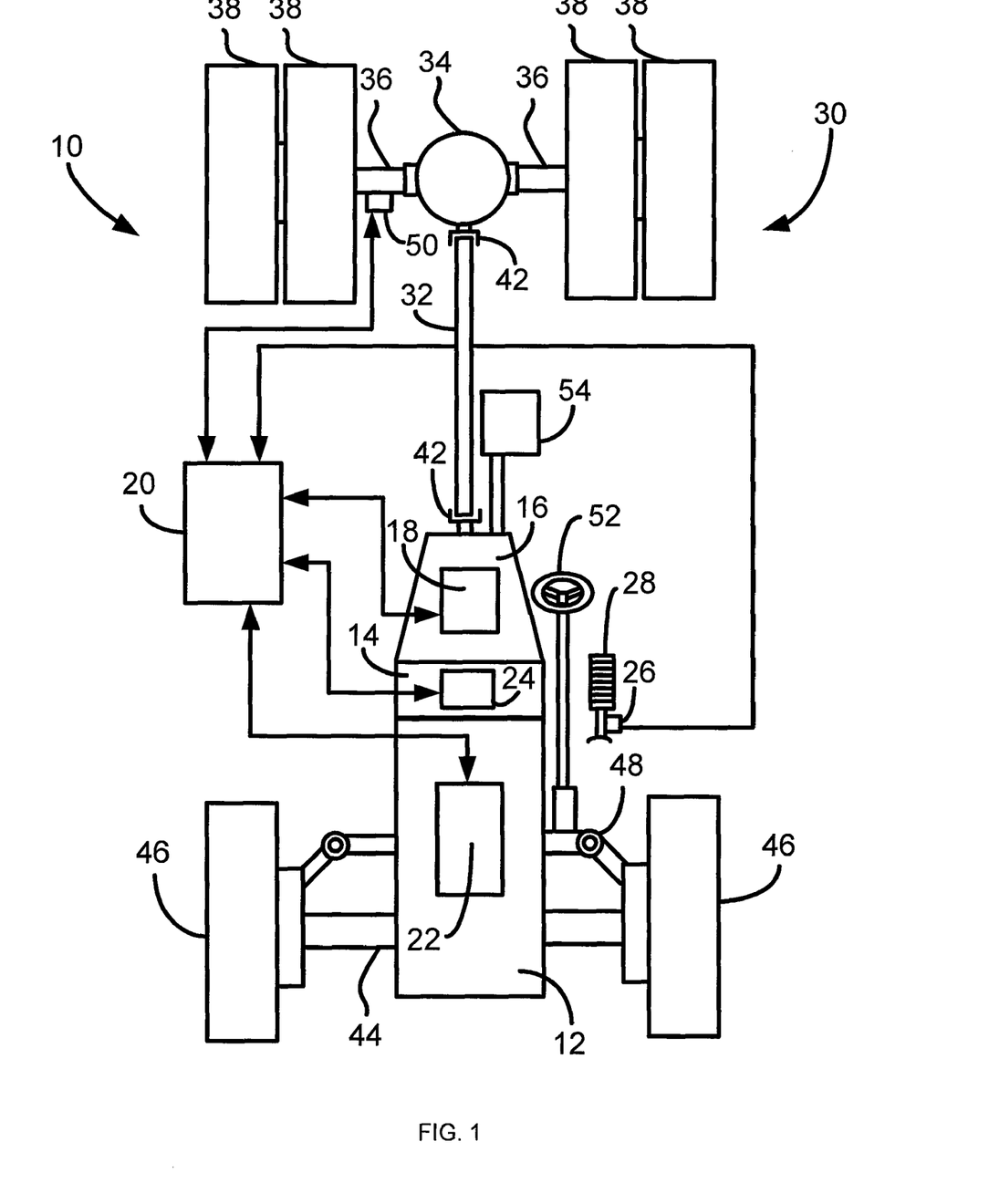
FIG. 1 is a diagram illustrating an exemplary vehicle.

FIG. 1 is a diagram illustrating an exemplary vehicle. A vehicle 10 includes a prime mover 12 which may be an internal combustion gas, natural gas, or diesel engine. In some embodiments, the prime mover 12 is an electric motor. In other embodiments, the prime mover 12 may be a combination of any two power sources, such as an electric motor and an internal combustion engine, that individually or cooperatively provide power to move the vehicle 10. Vehicles containing two or more power sources are often referred to as hybrid vehicles. In one embodiment, an output of the prime mover 12 may be to a master friction clutch 14.

The master friction clutch 14 selectively and positively engages some or all of the power output of the prime mover 12 to an input of a multiple speed gear change transmission 16. While not shown in FIG. 1, in some hybrid vehicle embodiments, the master friction clutch 14 may decouple the power output of one power source of the prime mover 12, such as an internal combustion engine, from an input of the transmission 16, while allowing the power output of a second power source of the prime mover 12, such as an electric motor, to remain coupled to a transmission input. In one such configuration, an internal combustion engine may be coupled to the vehicle drivetrain upstream of the master friction clutch 14, while an electric motor may be coupled to the vehicle drivetrain downstream of the master friction clutch 14. The transmission 16 may be of the type currently referred to as an automated mechanical transmission (AMT) wherein gear or speed ratio changes of a main transmission, a splitter, and a planetary gear assembly, for example, are all achieved by an automated, i.e., electric, hydraulic or pneumatic, shift and actuator assembly 18 under the control of a master microprocessor or controller 20.

The master microprocessor or controller 20 also includes a data and control link to a prime mover controller 22 which will typically include a prime mover speed sensor and a fuel control or other power metering device, such as a throttle, capable of adjusting and controlling the speed or power output of the prime mover 12. In one embodiment, the controller 20 includes a driving speed control unit to adjust or maintain the speed of the vehicle 10. The master controller 20 may also provide control signals to a master friction clutch operator assembly 24 which controls the engagement and disengagement of the master friction clutch 14. A throttle position sensor 26 senses the position of a vehicle throttle, power metering device, or accelerator pedal 28 and may provide real time data regarding the setting of a prime mover power metering device or position of the throttle pedal 28 to the master controller 20. A vehicle speed sensor 50 may provide an input indicative of the number of revolutions of the axle 36 (and thus the wheels 38) per unit of time, which may be used by the master controller 20 to compute the real-time speed of the vehicle 10. In another embodiment, the vehicle speed sensor 50 is a wheel speed sensing component of a vehicle braking system, such as an anti-lock braking system (ABS) or an electronic braking system (EBS), and provides an input indicative of the wheel speed.

The master microprocessor or controller 20 and all of its components may be implemented in hardware, such as circuitry suitable to implement the functionality as described herein, software (software includes firmware), or a combination of hardware and software. In one embodiment, the controller 20 may incorporate other functionality, and therefore may also monitor and control other systems of the vehicle 10 in addition to the transmission 16. In another embodiment, the controller 20 primarily monitors the transmission 16 and controls the selection of gears or speed ratios of main transmission, splitter and planetary gear assembly, and may exchange commands and status messages with other microprocessors or controllers in the vehicle 10.

The output of the transmission 16 is provided to a driveline assembly 30, including a propshaft 32 that drives a differential 34. The differential 34 provides drive torque to a pair of axles 36 which are in turn coupled to rear left and right tire and wheel assemblies 38 which may be either a dual configuration as illustrated or a single left and right tire and wheel assembly. Suitable universal joints 42 may be utilized as necessary with the rear propshaft 32 to accommodate static and dynamic offsets and misalignments thereof. An axle 44 pivotally supports a pair of front tire and wheel assemblies 46 which are controllably pivoted by a steering linkage 48 which is coupled to and positioned by a steering wheel 52. Other embodiments of the vehicle 10 are also possible, including configurations where the front tire and wheel assemblies 46 are driven by the prime mover 12 through the driveline assembly 30 and the rear left and right tire and wheel assemblies 38 are not driven, and configurations where all of the wheels 46 and 38 are driven by the prime mover 12 through the driveline assembly 30.

An additional output of the transmission 16 may be coupled to a power-take off ("PTO") assembly 54 that may include, but is not limited to, a PTO component, such as a gear or shaft, that may engage with the transmission 16 to provide power for any variety of PTO operations. For example, when a prime mover 12 provides power to the transmission 16, a PTO component may be driven by a gear or shaft of the transmission 16. Consequently, the PTO component may provide power or energy to a pump, a generator, a ladder, a gear or pulley system, or any known or future mechanical, fluid, and/or electrical system. Any PTO component of the PTO assembly may be in or on the vehicle tractor and/or the vehicle trailer. Alternatively, the PTO assembly 54 and a respective PTO component may be on a vehicle not associated with a trailer, such as a fire engine or other non-trailer vehicle.

Figure 2A:
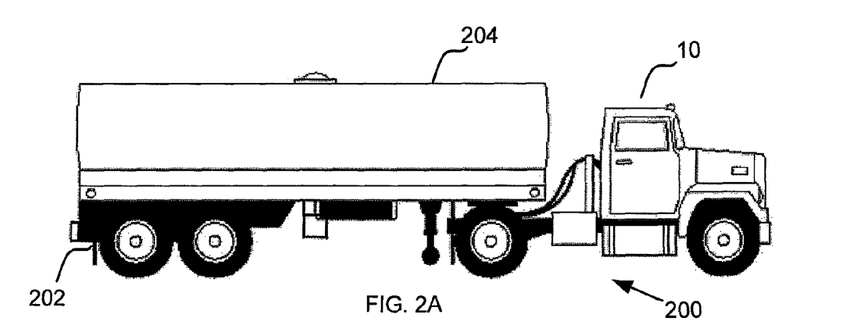
FIG. 2A is a diagram illustrating an exemplary tanker truck.
Figure 2B:
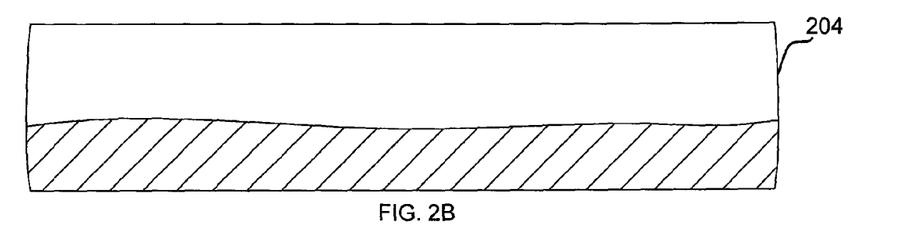
FIG. 2B is a diagram illustrating a cross-sectional view of a partially filled liquid tank.

FIG. 2A illustrates an exemplary tanker truck. A tanker truck 200 comprises a tractor 10, and a tank trailer 202 comprising a liquid tank 204. FIG. 2B illustrates a cross-sectional view of a partially filled liquid tank 204. When the tanker truck 200 is on a level surface and stationary or travelling at a relatively constant velocity for a period of time, the liquid is at approximately a uniform level throughout the liquid tank 204.

Figure 2C:
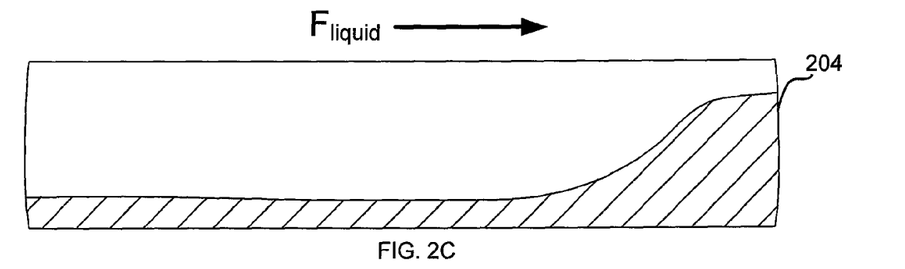
FIG. 2C is a diagram illustrating a cross-sectional view of a partially filled liquid tank.

FIG. 2C illustrates a cross-sectional view of a partially filled liquid tank 204. As the tanker truck 200 decelerates, the forward momentum of the liquid causes it to continue moving in the direction of travel of the tanker truck 200 until it collides with the front wall of the liquid tank 204. The inertia of the liquid imparts a force which acts against the deceleration forces provided by the tractor 10 brakes or prime mover brake (such as engine braking or exhaust braking), and may accelerate the tanker truck 200.

Figure 2D:
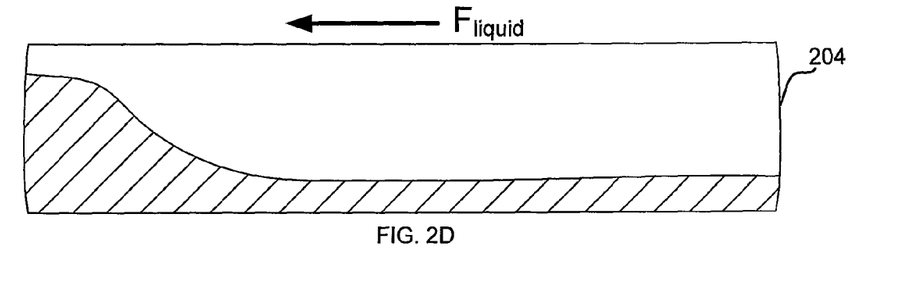
FIG. 2D is a diagram illustrating a cross-sectional view of a partially filled liquid tank 204.

FIG. 2D illustrates a cross-sectional view of a partially filled liquid tank 204. As the tanker truck 200 accelerates, the inertia of the liquid causes it to travel in the opposite direction of travel of the tanker truck 200 until it collides with the rear wall of the liquid tank 204. The inertia of the liquid imparts a force which acts against the acceleration forces provided by the tractor 10 prime mover 12, and may decelerate the tanker truck 200. Further, the sloshing of liquid against the back and front of the tank shown in FIGS. 2C and 2D may repeat in a cycle during acceleration or deceleration of the tanker truck 200.

Liquid sloshing effects may be reduced by ensuring that the liquid tank 204 is nearly filled to reduce the available air space for sloshing. However, it may be inefficient to transport more liquid than required for a delivery simply to reduce sloshing forces in the liquid tank 204. Baffles also may be added to the liquid tank 204 in an attempt to reduce the relative speed difference between the liquid tank 204 and the liquid. The baffles may segment the liquid into smaller volumes, which individually impart less sloshing force on the tank walls. However the baffled tank segments collectively may produce the same or even more erratic liquid sloshing forces.

Special tank geometries may be employed to reduce liquid sloshing effects. For example, the liquid tank 204 may be separated into two enclosed halves (a bottom half and a top half) connected by a passage. The two halves are then assembled together. However, the resulting tank assembly may be more prone to leaks, and the tanks employing special geometries may be more expensive to manufacture. Even if a liquid tank 204 with special geometries eliminates or reduces the sloshing forces, a tractor 10 may be used to pull tanker trailers 202 without these special geometries. Therefore, an automated mechanical transmission design should not rely on or require the use of a particular tanker trailer 202 design with specialized geometries.

Figure 3:
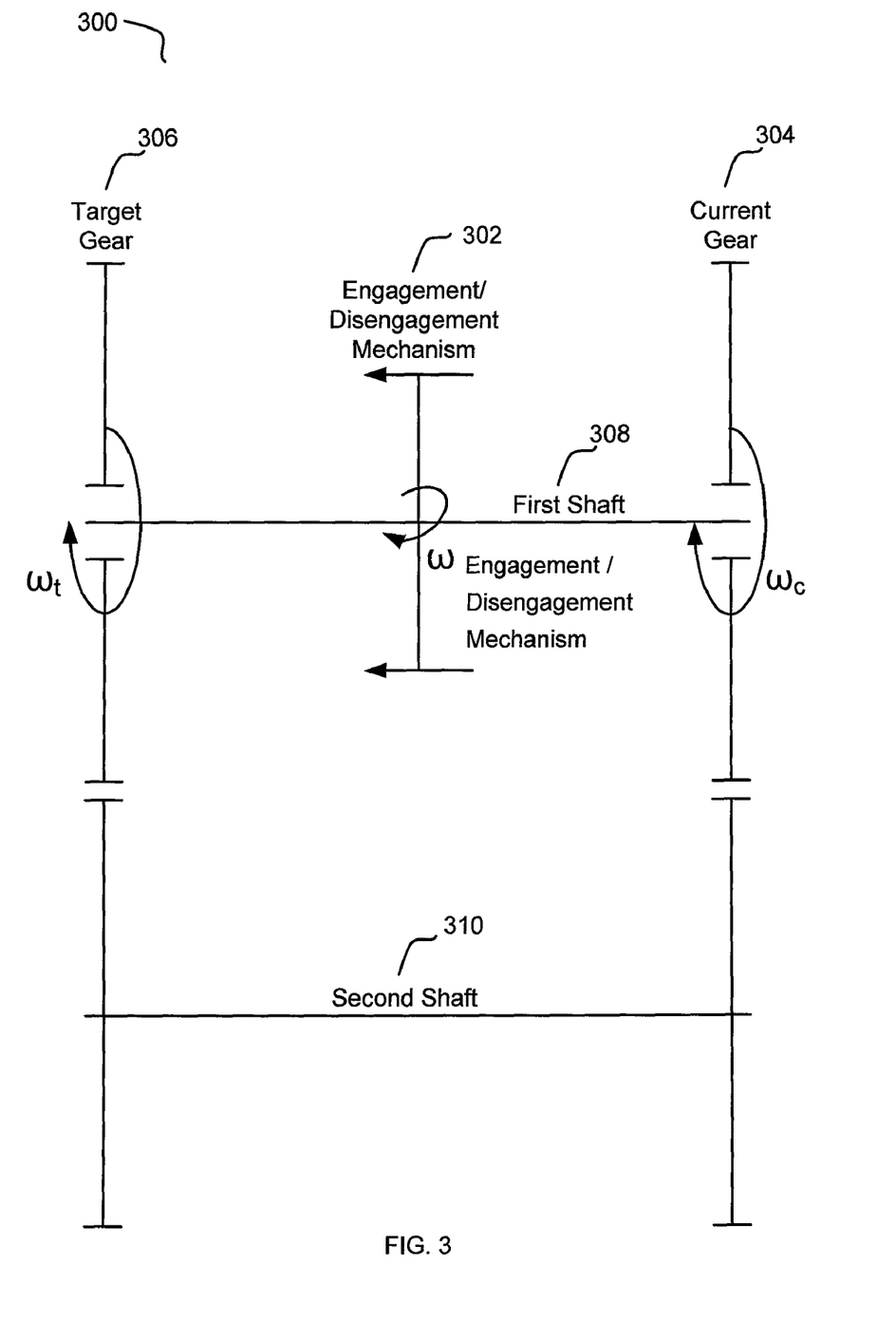
FIG. 3 is a diagram illustrating an exemplary gearset during a gear ratio change within an automated mechanical transmission.

Liquid sloshing may impair or prevent gear ratio changes of automated mechanical transmissions in tanker trucks. FIG. 3 illustrates an exemplary gearset 300 during a gear ratio change (alternatively known as a shift) within an automated mechanical transmission. Gearset 300 has a disengagement and engagement mechanism 302 such as a dog clutch or synchronizer. During a transmission shift, the disengagement and engagement mechanism 302 disengages the current gear 304 and engages the target gear 306. Before a transmission shift, the following equation applies when the road speed is constant during the gear ratio change:

$$\omega_t^*(N_{T(first\ shaft)}/N_{T(second\ shaft)}) = \omega_c^*(N_{C(first\ shaft)}/N_{C(second\ shaft)}) \quad (1)$$

In equation 1, $\omega_t$ is the rotational speed (angular velocity) of the target gear, $\omega_c$ is the rotational speed (angular velocity) of the current gear, $N_{C(first\ shaft)}$ is the number of teeth on the current gear, which is concentric with a first shaft 308, $N_{C(second\ shaft)}$ is the number of teeth on the current gear, which is concentric with a second shaft 310, $N_{T(first\ shaft)}$ is the number of teeth target gear, which is concentric with the first shaft 308, and $N_{T(second\ shaft)}$ is the number of teeth on target gear, which is concentric with the second shaft 310. Equation 1 can be rearranged to yield:

$$\omega_t = (N_{T(second\ shaft)}/N_{T(first\ shaft)})^*\omega_c^*(N_{C(first\ shaft)}/N_{C(second\ shaft)}) \quad (2)$$

If the shift from the current gear to the target gear represents a transmission upshift, defined as a change from a higher gear ratio to a lower gear ratio, then inspection of equation 2 indicates that immediately before an upshift, $\omega_t > \omega_c$. During that gear ratio change, $\omega_t$ is typically decreased by several forces such as open clutch losses, shift forces applied by the transmission solenoid, and deceleration forces associated with the application of a transmission shaft brake by the controller 20. If the shift from the current gear to the target gear represents a transmission downshift, defined as a change from a lower gear ratio to a higher gear ratio, then inspection of equation 2 indicates that immediately before a downshift, $\omega_t < \omega_c$. During that gear ratio change, $\omega_t$ is typically increased by the force of the transmission solenoid and the prime mover 12. In upshifts and downshifts, the controller 20 operates the transmission shaft brake or adjusts the prime mover speed to achieve the desired $\omega_t$ necessary for proper engagement of the dog clutch.

If the road speed changes abruptly because of acceleration or deceleration of the vehicle from liquid sloshing, $\omega_{engagement/disengagement\ mechanism}$ changes rapidly, because the rotational speed (angular velocity) of the engagement/disengagement mechanism 302 is a function of the liquid force that may accelerate or decelerate the tanker truck 200. As a result, the controller 20 cannot accurately predict the $\omega_t$ required for engagement of the target gear, and shifting may be impaired.

Figure 4:
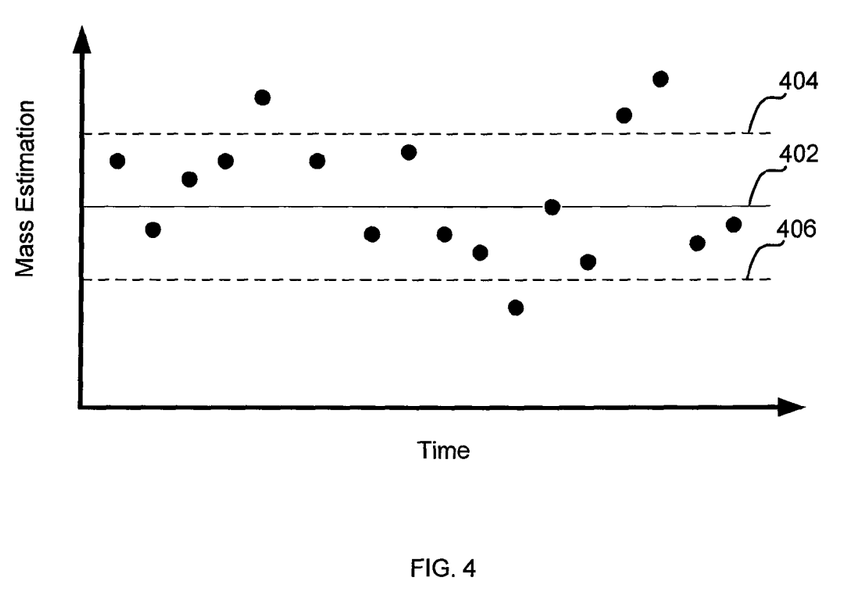
FIG. 4 is a graph illustrating exemplary vehicle mass calculations where liquid sloshing events occur during acceleration or deceleration of a tanker truck.

FIG. 4 shows an exemplary summary of vehicle mass calculations where liquid sloshing events occur during acceleration or deceleration of a tanker truck. The mass of a vehicle may be estimated when the vehicle is accelerating by using Newton's second law of motion:

$$F = mass * acceleration \quad (3)$$

The prime mover 12 of the vehicle 10 supplies a force that eventually results in a traction force at the wheels 38. This force is opposed by forces such as the rolling resistance and wind resistance of the vehicle. When the vehicle is traveling up a grade, this traction force is also opposed by the component of the gravitational force that is parallel to the road surface. Similarly, when the vehicle is traveling down a grade, the traction force is supplemented by the component of the gravitational force that is parallel to the road surface. The resulting net force may accelerate or decelerate the inertial mass of the vehicle. The force and acceleration can be calculated or measured. For example, traction force may be calculated using known information such as the current transmission gear ratio, prime mover speed, and throttle position. The acceleration of the vehicle may be calculated, for example, by determining the change in measured vehicle wheel speed as a function of time. Using the measured or calculated values for force and acceleration, Equation 3 can then be used to determine the inertial mass of the vehicle.

As shown in FIG. 4, these measurements may be repeated periodically. Minor variations may occur in the calculated mass value. To reduce the effect of these variations, an average mass 402 may be utilized to determine the appropriate gear ratio change algorithm to use for improved fuel efficiency. Referring back to FIGS. 2C and 2D, a sloshing force of an unknown magnitude may also accelerate or decelerate a tanker truck. For example, FIG. 2D shows the inertia of the liquid imparting a force which acts against the acceleration forces provided by the prime mover 12 of the tractor 10, and may reduce the acceleration of the tanker truck 200. Similarly, FIG. 2C shows the inertia of the liquid imparting a force which acts with the acceleration forces provided by the prime mover 12 of the tractor 10, and may increase the acceleration of the tanker truck 200.

If the control system does not account for liquid sloshing forces when calculating the mass of the vehicle, an erroneous mass calculation may result. For example, the increased acceleration of the vehicle caused by liquid sloshing may be incorrectly attributed to a lower mass. Similarly, the decreased acceleration of the vehicle due to liquid sloshing may be incorrectly attributed to a higher mass.

The result of incorrect mass calculations is shown in FIG. 4, which shows several mass calculations above the expected maximum mass value 404 or below the expected minimum mass value 406. These erroneous mass calculations may be attributable to sloshing forces for which the control system did not account when calculating vehicle mass. These erroneous calculations may decrease the accuracy of the average mass calculation. Thus, the controller 20 may select an incorrect gear shift based on an erroneous mass calculation.

Figure 5:
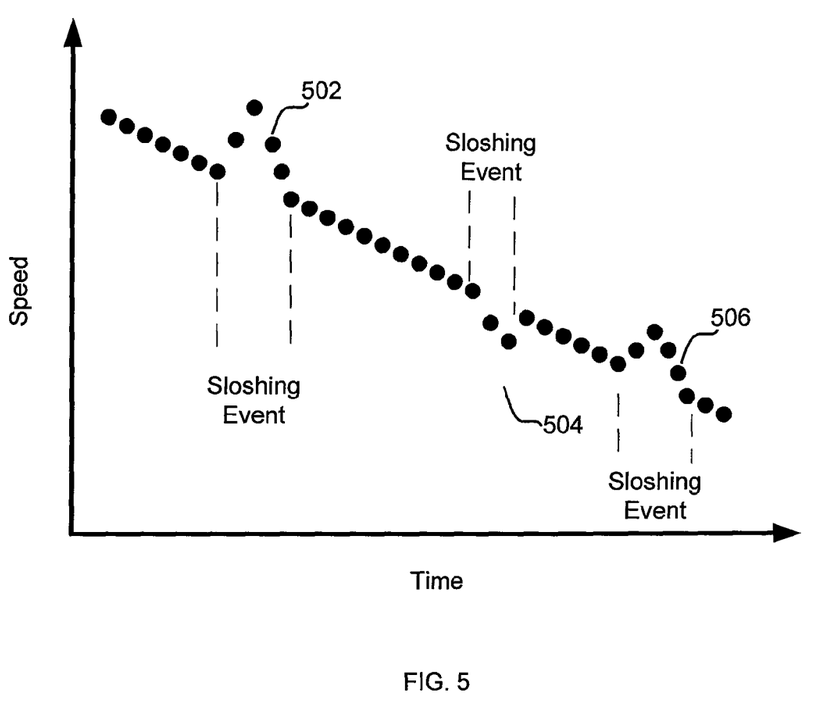
FIG. 5 shows an exemplary vehicle velocity graph for a decelerating tanker truck that is experiencing liquid sloshing.

FIG. 5 shows an exemplary vehicle velocity graph for a decelerating tanker truck that is experiencing liquid sloshing. While decelerating, the tanker truck 200 experiences a number of sloshing events 502, 504, 506. In the first event 502, the inertia of the liquid sloshing forward imparts a force by colliding with the front of the liquid tank 204, which accelerates the tanker truck 200. In the second event, the inertia of the sloshing liquid imparts a force by colliding with the rear of the liquid tank 204, which decelerates the tanker truck 200. In the third event 502, the inertia of the sloshing liquid again imparts a force by colliding with the front of the liquid tank 204, which accelerates the tanker truck 200.

As explained in FIGS. 2-5 and the accompanying text, sloshing forces may result in inaccurate mass estimations, and thus incorrect selection of shifting algorithms and gear shifts in automated manual transmission systems. Sloshing forces may also cause missed shifts, uncomfortable shifts, and/or vehicle-destabilizing shifts. Further, sloshing during transmission gear ratio changes may damage components of the transmission or vehicle drive train.

In one embodiment, a shifting algorithm in an automated manual transmission system may account for liquid sloshing conditions. The shifting algorithm may be enabled by triggers corresponding to trigger events that are typically associated with an increased potential for sloshing. Once enabled, the algorithm delays transmission gear ratio changes during those conditions or inhibits shifting during conditions typically associated with sloshing.

Figure 6:
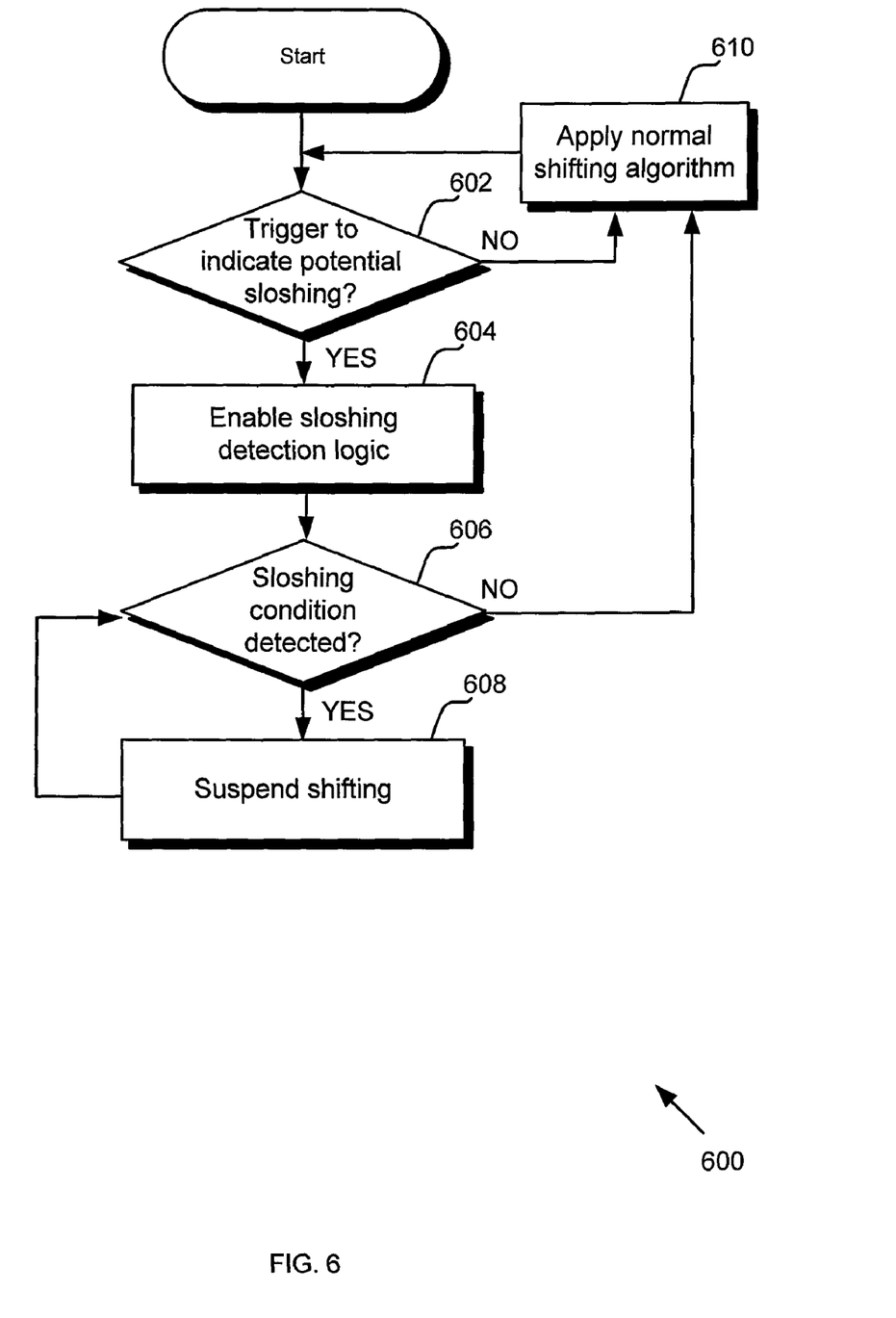
FIG. 6 shows exemplary steps for processing liquid sloshing events in a tanker truck according to an embodiment.

FIG. 6 shows exemplary steps for processing liquid sloshing events in a tanker truck according to an embodiment. The exemplary steps 600 may be implemented in hardware or software in the master microprocessor or controller 20 of the tractor 10 of FIG. 1. Control begins at step 602, where the controller 20 recognizes an active sloshing event trigger. A sloshing event trigger may be received at the controller 20 from an external source. Table 1 shows an exemplary list of external triggers, which are described in the subsequent paragraphs.

TABLE 1

| Trigger | Description |
| --- | --- |
| 1 | Trailer identification value |
| 2 | PTO equipped |
| 3 | Driver switch or button |
| 4 | Sloshing sensor |
| 5 | CAN message |
| 6 | Wheel slip |
| 7 | Wheel speed |
| 8 | Brake pedal position |
| 9 | Throttle pedal position |

If the truck tractor 10 is connected to a trailer with an identification value that corresponds to a tanker trailer 202, then liquid sloshing may occur during the operation of the tanker truck 200. A controller 20 may receive an input indicative of the trailer ID value. Similarly, a tanker trailer 202 may be equipped with one or more liquid pumps powered by a power take off unit (PTO) 54 coupled to the vehicle transmission 16. A transmission 16 equipped with a power take off unit 54, may be indicative of the presence of a liquid tank 204 being transported or towed by the vehicle 10, and thus, sloshing may occur during operation of the vehicle. The controller 20 may receive an input that indicates that the transmission 16 is equipped with or connected to a power take off unit 54. Similarly, a driver may operate a switch or button to indicate to the controller 20 that the vehicle 10 is pulling a tanker trailer 202.

The controller 20 may receive inputs indicative of wheel slip or a change in tire traction caused by a sudden acceleration or deceleration due to sloshing. The wheel slip may indicate a sudden transfer of kinetic energy to or from the sloshing liquid to the tanker truck as the liquid rebounds against the tank ends. In one embodiment, wheel slip may be detected by receiving an input indicative of wheel speed, and detecting discontinuities in wheel speed. In another embodiment, wheel slip may be detected by energy fluctuation between the inertia of a vehicle tire and the inertia of the surface of a vehicle tire.

The controller 20 also may receive a message that liquid sloshing could occur during operation of the vehicle. The message may be received directly from a sloshing sensor, or may be received over a vehicle Controller Area Network (CAN) bus in accordance with standards such as the SAE J1939-71 standard. The controller 20 may receive inputs that indicate the position of the throttle pedal and/or the brake pedal. Depressing the vehicle brake pedal to a predetermined position or at a predetermined rate may result in a deceleration rate large enough to cause sloshing. Similarly, depressing the throttle pedal or accelerator pedal to a predetermined position or at a predetermined rate may result in an acceleration rate large enough to cause sloshing.

A sloshing event trigger may be calculated by the controller 20 using inputs or other data accessible to the controller. Table 2 shows an exemplary list of triggers internal to the controller.

TABLE 2

| Trigger | Description |
| --- | --- |
| 1 | Discontinuity in vehicle speed |
| 2 | Discontinuity in calculated mass |

The controller may detect a discontinuity in vehicle speed, such as the events 502, 504, 506 shown in FIG. 5, where the vehicle speed suddenly increases or decreases because of sloshing, deviating from a generally linear deceleration from the application of vehicle brakes, a prime mover brake such as an engine brake or exhaust brake, or another drivetrain brake such as a driveline retarder. Vehicle speed values typically available to the controller 20 may include wheel speed values utilized by anti-lock braking (ABS) systems, vehicle speed inputs used by tachographs, transmission 16 output shaft speeds, or other speed values, such as may be transmitted over a vehicle Controller Area Network (CAN) bus in accordance with standards such as the SAE J1939-71 standard. The controller 20 may treat one or more discontinuities in vehicle speed within a predetermined time interval as a trigger event.

Similarly, the controller 20 may periodically calculate the tanker truck 200 mass in order to select a transmission shift algorithm appropriate for the overall mass of the tractor 10 and tanker trailer 202. As shown in FIG. 4, liquid sloshing may cause mass calculations that are outside of an expected range. Recognizing this, the controller 20 may treat one or more aberrant mass calculations within a predetermined time interval as a trigger event.

Referring back to step 602, if a trigger event is not active, then control passes from step 602 to step 610, and where the controller applies a typical shifting algorithm appropriate in the absence of sloshing. Control may then pass from step 610 back to step 602 to periodically check for a trigger condition indicative of liquid sloshing. If the sloshing trigger is active, such as would be the case when the controller 20 recognizes that a tanker trailer 202 is coupled to the tractor 10 as listed in Table 1, then control passes from step 602 to step 604, where the controller enables sloshing detection logic, such as circuitry or hardware, software or firmware, or any combination thereof. The enabled logic may perform calculations based on data received or stored in the controller, or based on data or input signals received from sensors in the tanker truck 200.

Control then passes to step 606, where the controller 20 determines if condition indicative of sloshing is detected. An exemplary list of conditions is show in Table 3:

TABLE 3

| Condition | Description |
| --- | --- |
| 1 | Heavy braking |
| 2 | Heavy acceleration |
| 3 | Mass calculation irresolvable (and time) |
| 4 | Velocity change outside of tolerance (and time) |
| 5 | Sloshing sensor active |
| 6 | Vehicle position in area previously associated with liquid sloshing |

Sloshing in the liquid tank 204 may occur under heavy braking or heavy acceleration of the tanker truck 200. In both cases, the inertia of the liquid is likely to impart a force in the front or rear wall of the liquid tank 204. Heavy braking or acceleration may be detected by calculating or measuring the acceleration of the vehicle and comparing it to a predetermined minimum or maximum limit, or by detecting the position of the brake pedal or throttle pedal over a period of time.

A third condition may include a calculation of the tanker truck 200 mass that cannot be resolved or that falls outside of a threshold of an expected value, such as a mass calculation that differs from one or more mass calculations (or an average of two or more previous mass calculations) by a predetermined limit. For example, three mass calculations in FIG. 4 are above a predetermined upper limit 404, and one mass calculation is below a predetermined lower limit 406. In another embodiment, a mass calculation that cannot be resolved may include a mass calculation that is below the mass of the tractor 10, or greater than the maximum gross vehicle weight of the tanker truck 200. A fourth condition may include a velocity change over a period of time that is outside of a predetermined limit. Referring to FIG. 5, an increase in velocity during deceleration may constitute a condition indicative of sloshing. Similarly, an abrupt decrease in velocity during deceleration may also indicate sloshing. In one embodiment, the vehicle velocity may be compared with an expected velocity (or change in velocity) for a given vehicle mass, surface grade, transmission gear ratio, throttle and brake inputs. A change in velocity that differs from what is expected may indicate additional acceleration or deceleration forces caused by liquid sloshing.

A fifth condition may include a sloshing sensor indicating the occurrence of a sloshing event. For example, a sloshing sensor may generate a signal indicative of the position of a float device within the liquid tank 204. The controller 20 may identify a sloshing condition when excessive movement or fluctuation of the float device occurs. In another example, a sloshing sensor may generate a signal indicative of the position of a spring-loaded plate immersed in the liquid tank 204. The controller 20 may identify a sloshing condition when excessive movement of liquid in the tank displaces the plate from a neutral position.

A sixth condition may include receiving the position of the tanker truck, such as through a global positioning system (GPS) receiver, and comparing the tanker truck position to a list or database of locations associated with liquid sloshing. For example, if a sloshing event occurs at a location, the controller 20 may store the location in a database for future use. The database may be stored locally in the controller 20, or remotely in a database accessible over a wired or wireless interface. The controller 20 may then detect that the tanker truck has returned to that location (or within a certain threshold distance of that location), such as when a tanker truck passes though the same location for a scheduled delivery on a periodic basis.

If a condition indicative of sloshing is detected, control passes from step 606 to step 608, in which transmission shifting is disabled. The control loop between steps 606 and 608 allows shifting to remain disabled until the condition indicative of sloshing is no longer detected. Referring back to step 606, if a condition indicative of sloshing is not detected, control passes from step 606 to step 610, where the controller applies a typical shifting algorithm appropriate in the absence of sloshing.

Inspection of Tables 1 and 3 show that some trigger events and sloshing conditions may overlap. For example, the brake pedal position trigger event of Table 1 and the heavy braking sloshing condition from Table 3 may be essentially the same test. Similarly, the discontinuity in vehicle speed trigger event from Table 2 and the velocity change outside of tolerance sloshing condition from Table 3 may essentially be the same test performed by the controller 20. Referring to FIG. 6, in such cases, steps 602, 604, and 606 may combine into a single test where a normal shifting algorithm is applied if a trigger event and condition indicative of sloshing is not detected, and where an ability to change gear ratios is disabled while a trigger event and sloshing condition is present.

Thus, a controller 20 shifting algorithm in an automated manual transmission system may account for liquid sloshing conditions. The shifting algorithm may be enabled by triggers corresponding to trigger events that are typically associated with the potential of sloshing. Once enabled, the algorithm delays transmission gear ratio changes during those conditions or inhibits shifting during conditions typically associated with sloshing. By disabling transmission gear ratio changes during sloshing conditions, missed shifts, uncomfortable shifts, and/or vehicle-destabilizing shifts may be reduced or avoided. Further, the risk of damaging components of the transmission or vehicle drive train during transmission gear ratio changes may be reduced.

Although the invention has been described with respect to various system and method embodiments, it will be understood that the invention is entitled to protection within the full scope of the appended claims.

The invention claimed is:

1. A method of changing gear ratios of a transmission in a vehicle transporting a liquid, the method comprising:
   receiving a request to change a gear ratio in a transmission of a vehicle transporting a liquid, wherein the change is from a current gear ratio to a target gear ratio;
   rejecting the request if a condition indicative of liquid sloshing is detected; and
   changing the gear ratio in the transmission from the current gear ratio to the target gear ratio if the condition indicative of liquid sloshing is not detected.

2. The method of claim 1, wherein the condition comprises a measured vehicle acceleration exceeding a predetermined limit.

3. The method of claim 1, wherein the condition comprises a measured vehicle deceleration exceeding a predetermined limit.

4. The method of claim 1, wherein the condition comprises a change in vehicle velocity exceeding a predetermined limit.

5. The method of claim 1, wherein the condition comprises a vehicle mass calculation that falls outside of a threshold of a previous mass calculation.

6. The method of claim 1, wherein the condition comprises a vehicle mass calculation that falls outside of a threshold of an average mass calculation.

7. The method of claim 1, wherein the condition comprises a current vehicle location within a threshold distance of a previous location associated with liquid sloshing.

8. The method of claim 1, further comprising receiving a trigger to enable the detection of liquid sloshing, wherein the trigger is indicative of the occurrence of a triggering event.

9. The method of claim 8, wherein the triggering event comprises a vehicle wheel speed measurement that differs from a previous vehicle wheel speed measurement by a predetermined threshold.

10. The method of claim 8, wherein the triggering event comprises a predetermined position of a vehicle brake pedal.

11. The method of claim 8, wherein the triggering event comprises a predetermined position of a vehicle accelerator pedal.

12. A method of changing gear ratios of a transmission in a vehicle transporting a liquid, the method comprising:
   detecting a condition indicative of liquid sloshing in a vehicle transporting a liquid; and
   disabling an ability to change a gear ratio in the transmission of the vehicle from a current gear ratio to a target gear ratio.

13. The method of claim 12, further comprising:
   detecting an absence of the condition indicative of liquid sloshing; and
   restoring the ability to change a gear ratio in the transmission of the vehicle from the current gear ratio to the target gear ratio.

14. The method of claim 12, wherein the condition comprises a measured vehicle acceleration exceeding a predetermined limit.

15. The method of claim 12, wherein the condition comprises a measured vehicle deceleration exceeding a predetermined limit.

16. The method of claim 12, wherein the condition comprises a change in vehicle velocity exceeding a predetermined limit.

17. The method of claim 12, wherein the condition comprises a vehicle mass calculation that falls outside of a threshold of a previous mass calculation.

18. The method of claim 12, wherein the condition comprises a vehicle mass calculation that falls outside of a threshold of an average mass calculation.

19. The method of claim 12, wherein the condition comprises a current vehicle location within a threshold distance of a previous location associated with liquid sloshing.

20. The method of claim 12, further comprising receiving a trigger to enable the detection of liquid sloshing, wherein the trigger is indicative of the occurrence of a triggering event.

21. The method of claim 20, wherein the triggering event comprises a vehicle wheel speed measurement that differs from a previous vehicle wheel speed measurement by a predetermined threshold.

22. The method of claim 20, wherein the triggering event comprises a predetermined position of a vehicle brake pedal.

23. The method of claim 20, wherein the triggering eve comprises a predetermined position of a vehicle accelerator pedal.

24. A vehicle, comprising:
   a prime mover;
   a transmission operative to couple prime mover power from a transmission input to a transmission output at a plurality of different gear ratios;
   a sensor, operative to receive a signal indicative of sloshing of a liquid transported by the vehicle; and
   a controller, in communication with the sensor and the transmission, operative to:

select a current gear ratio of the transmission;
detect a condition indicative of sloshing of the liquid transported by the vehicle;
disable a selection of a target gear ratio of the transmission if the condition indicative of liquid sloshing is detected; and select a target gear ratio of the transmission if the condition indicative of liquid sloshing is not detected.

* * * * *